July 23, 1957    A. V. STEPHENS    2,800,291
SOLID BOUNDARY SURFACE FOR CONTACT WITH A
RELATIVELY MOVING FLUID MEDIUM
Filed Oct. 20, 1951    2 Sheets-Sheet 2

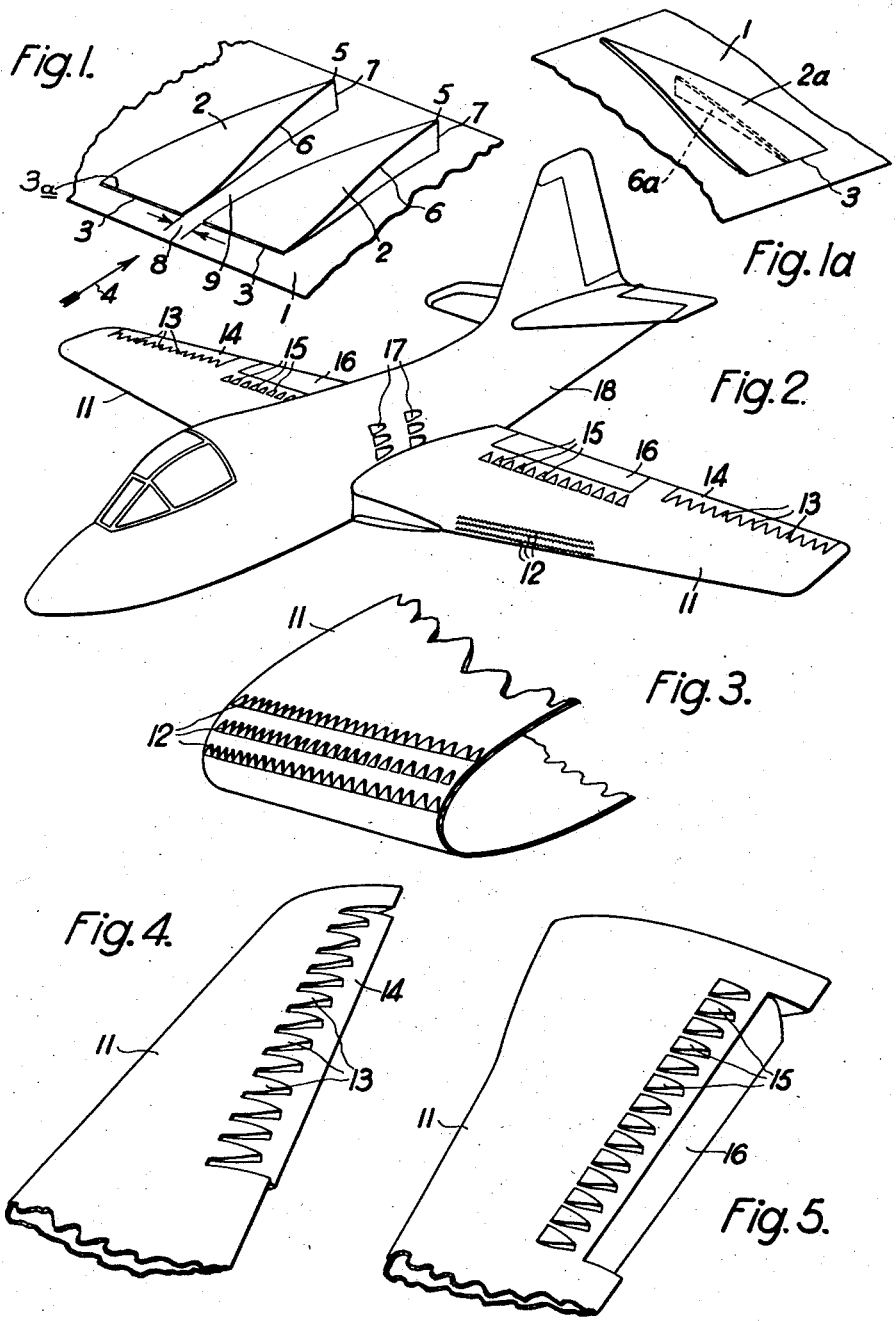

INVENTOR
Arthur Veryan Stephens
BY G.R.Odell
ATTORNEY

United States Patent Office 2,800,291
Patented July 23, 1957

2,800,291

SOLID BOUNDARY SURFACE FOR CONTACT WITH A RELATIVELY MOVING FLUID MEDIUM

Arthur Veryan Stephens, Elizabeth Bay, Sydney, New South Wales, Australia

Application October 20, 1951, Serial No. 252,233

Claims priority, application Great Britain October 24, 1950

17 Claims. (Cl. 244—41)

This invention relates to boundary surfaces between a solid and a fluid medium moving relatively past it. It is especially applicable in cases in which the surface profile is generally curved in sections normal to the surface and extending in the general direction of flow.

When flow of the medium takes place relative to such a surface a boundary layer of the medium is formed between the surface and the medium where it is flowing at full speed. This boundary layer usually thickens in proceeding along the surface in the direction of flow, and in the case of decelerating flow when its thickness is above a certain value, the flow leaves the surface altogether and a general region of turbulence is formed, that is to say, direct interaction between the surface and the flow ceases and the profile of the surface ceases to be effective. The point at which this phenomenon occurs is a function of the pressure gradient in the medium in the direction of flow, which in turn depends on the profile of the surface.

A purpose of the present invention is to delay or prevent separation of the flow by maintaining thinness of the boundary layer over a greater distance than is achieved with a plain smooth boundary surface, all other factors being equal. To this end the surface is given a conformation which while in general following the desired profile, splits the boundary layer and causes the outer part to be diverted into the general flow, leaving the inner thinner part to continue in contact with the boundary surface. This splitting may be effected once, or more times in succession.

More specifically, the splitting is effected by dividing up the boundary layer into side by side sections, diverting alternate sections away from the surface so that these are projected into the medium some distance away from the boundary surface itself, and allowing the remaining sections to expand laterally into spaces adjacent the boundary surface from which the first mentioned sections have been diverted; since the momentum of the medium tends to be conserved, as these latter sections expand laterally they contract in a direction normal to the surface, i. e. the boundary layer in these sections becomes thinner.

Figure 7:
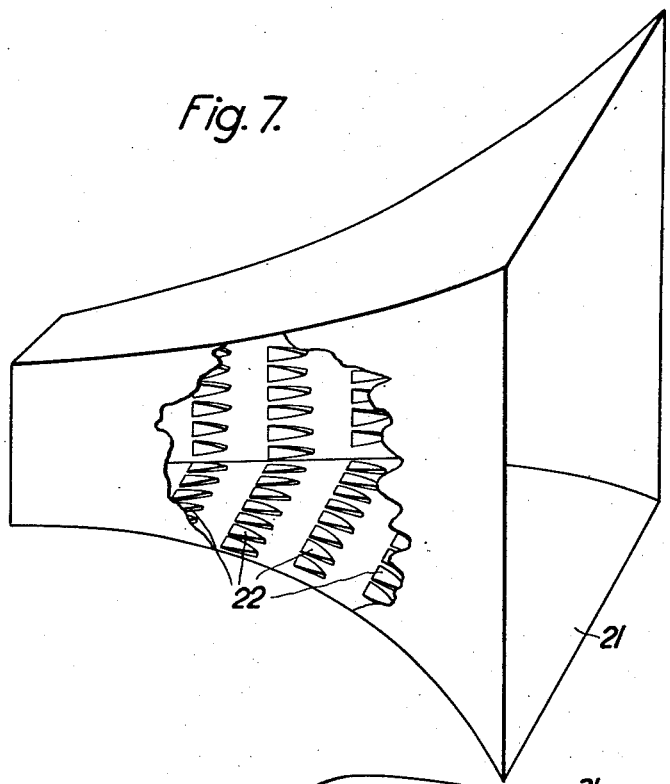
Figure 6:
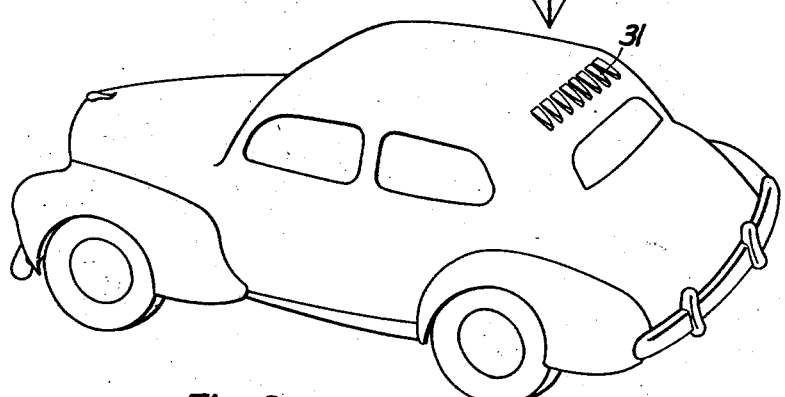

The invention will be further described with reference to the accompanying diagrammatic drawings in which:

Figure 1 is a detail perspective view of one form which the invention may take,

Figure 1a is a detail perspective view of another form which the invention may take, Figure 2 is a perspective view showing the application of the invention to various parts of an airplane, Figures 3, 4 and 5 are detail views on a larger scale of parts of Figure 2, Figure 6 is a perspective view illustrating the application of the invention to a motor vehicle, and Figure 7 is a perspective view of a diffuser or expanding duct to which the invention has been applied.

Figure 1 illustrates how the desired effect may be obtained by providing a boundary surface indicated generally at 1 with excrescences 2 of generally triangular plan.

The bases 3 of these excrescences face the flow indicated by the arrow 4 and lie in the general surface 1 and the excrescences rise in thickness to the apices 5. Desirably they are not strictly triangular in plan but as indicated have S shaped sides 6, first tapering slowly, then more rapidly, then more slowly to their apices where they intersect and form knife edges 7 substantially normal to the general surface 1. It will be seen that in transverse sections of the excrescences the junctions of the upper faces with the sides are in each case a sharp corner or in other words the upper faces terminate abruptly at the sides. In longitudinal section the upper surfaces may be straight, or may be curved for instance sloping down at both ends. In some cases the knife edged apices may be dispensed with and the rear part of the excrescences may be of rounded plan form. Alternatively the excrescences may take the form of thin plates occupying the position of the upper surfaces of the solid forms described above. Such thin plates are shown in Figure 1a and they are conveniently supported by a central web 6a. Practical tests have shown that this form gives almost the same result as the solid sided excrescences shown in Figure 1. It will be seen that as in the case of the excrescences above described the plates 2a shown in Figure 1a result in abrupt terminations at the sides of the upper faces of the excrescences. A row of excrescences is spaced apart so that the distance 8 between adjacent bases is a fraction of the length of the base say one sixth. Thus between adjacent excrescences is left a channel 9 which widens laterally in the direction of flow and it is the sections of the boundary layer which flow in these channels which expand laterally and contract in a direction normal to the surface 1, while the boundary layer over the upper surfaces of the excrescences is discharged into the medium at some distance from the contracted layer adjacent the surface.

There may be several rows of such excrescences across the surface, in which case they may be axially in line and the bases of those in one row may start at the apices of the row immediately preceding. Other relative arrangements may be used where the form of the surface requires for instance staggered rows in the case of swept aircraft wings. They may also be of different sizes either in plan or thickness in the same row or in successive rows depending on the conditions to be dealt with. In particular the height of the excrescences should be at least 1.5 times the 99 percent thickness of the boundary layer under the conditions for which the surface is designed. By the expression 99 percent thickness of boundary layer is meant the thickness at which the relative velocity between the surface and medium is 99 percent of that ultimately reached. Since the relative velocity approaches that of the free stream asymptotically the total layer is theoretically of infinite thickness and the 99 percent affords a readily ascertainable datum and represents the thickness which is important from the practical point of view. From the known properties of typical boundary surfaces, is the case for example of aircraft surfaces, a practical rule which satisfies the above condition is to make the height of the excrescences one thirtieth of the distance between the leading edge of the boundary surface and the bases of the row of excrescences. The excrescences may be fixed, or they may be movable, e. g. pivoted about their base lines as indicated by the hinges 3a in Fig. 1, to enable them to be brought out of action by lowering them flush with the general surface or to be brought to different heights or to be raised far enough say substantially perpendicular to the general surface to serve as brakes.

It is to be understood that though excrescences and and a general surface are referred to above, it does not follow that the general dynamic action is precisely that of a boundary surface identical with the general surface. From the point of view of the general dynamic action it might be more correct in some cases to regard the top surfaces of the excrescences as defining the boundary surface and the channels as being excavations; or the dynamic effect may otherwise be that of a surface lying intermediate the top surfaces of the excrescences and the bottoms of the channels.

Figures 2 to 7 illustrate examples of boundary surfaces to which the invention may be applied. An important example is an aerofoil, e. g. the wing of an aircraft, particularly a thin section wing for high speeds or a hydrofoil such as a control surface of a submarine craft. Thus in Figures 2 and 3 part of the leading edge of an airplane wing 11 is shown provided with three rows of excrescences 12. The rows are shown spaced apart in this example but might be arranged with apices of one row intersecting the bases of the next row as above mentioned.

Figure 2 also shows the application of the invention to control surfaces of the aircraft exemplified by ailerons and flaps, which are shown on a larger scale in Figures 4 and 5 respectively. Thus there is a row of excrescences 13 in association with the ailerons 14. As will be seen in Figure 4 the forepart of the aileron 14 is serrated with equally spaced triangular serrations and the rear of the wing 11 has solid extensions 13 which fit substantially into the serrations. When the aileron is in the neutral position the top surfaces of the extension 13 are substantially continuous with the surfaces of the aileron while when the aileron is moved out of neutral position these extensions automatically form the excrescences of the invention. The like arrangement can be used with control surfaces associated with a tailplane or fin or even between the hull of a ship and the rudder. Figure 5 shows a row of excrescences 15 in association with the flaps 16. These excrescences 15 may be desirably hinged along their base lines to allow them to be put out of action, i. e. sunk to bring their upper surfaces level with the general wing surface when the flap is not in use.

Figure 2 further shows as an example of the application of the invention to an aircraft hull or nacelle, two rows of excrescences 17 on the fuselage 18 located near the wing roots, where the likelihood of flow separation is great.

Another field of application somewhat similar to the hull or nacelle of an aircraft is the bodywork of a motor vehicle, an example being shown in Figure 6. Although the bodywork of present day motor vehicles is often described as "streamlined" the actual forms current are far from forms to which this term can be applied with any accuracy. The excrescences of the invention can be provided in single or multiple rows at any region where separation of flow is to be expected. Figure 6 shows a single row 31 at the top, rear bend of the vehicle body, a region at which flow separation is particularly prone to occur. The invention can similarly be applied to parts of the hull of a water craft.

Yet another field of application of the invention is to fluid ducts in which the flow of fluid would otherwise be rendered turbulent by changes in direction or section, e. g. bends or diffusers. As an example of this field, Figure 7 shows the invention applied to an expanding duct or diffuser 21 of square section, in which spaced rows of excrescences 22 are provided on the walls. As mentioned above instead of being spaced the rows of excrescences could be close together. The duct may be intended for a gaseous medium (being e. g. the diffuser of a jet engine compressor or an air intake) or for a liquid medium.

Another possible field of application of the invention is to the blades of screw propellers, whether for use in a gaseous medium, e. g. the propellers of aircraft, or a liquid media e. g. the propellers of ships. The excrescences might be applied for example along the leading edge, similarly to the excrescences 12 of Figure 2.

It should be explained that the excrescences of the invention need not be applied over the whole of the boundary surface, but may be confined, as in the illustrated drawings, to parts thereof where the problem of flow separation arises or is most acute.

I claim:

1. A substantially impervious body for movement in relation to a fluid medium having a region at which the boundary layer is likely to thicken and separate from the surface of the body, and comprising on its surface immediately in advance of said region at least one row of excrescences, each excrescence being of generally triangular outline set with its base facing the flow and lying in the general surface of the body, and rising in thickness to its apex, the height of the excrescences being at least 1.5 times the thickness of the 99 percent boundary layer under the conditions at which the boundary layer is likely to thicken and separate from the surface of the body, the distance between adjacent bases being a fraction of the length of a base, whereby channels are formed between the excrescences which widen laterally in the direction of flow.

2. In combination with an imperforate solid boundary surface over which a fluid medium is movable, a row of excrescences on the surface, each of generally triangular outline, set with its base facing the flow and lying in the general boundary surface and rising to its apex, the height of the excrescences being approximately one-thirtieth of the distance between the leading edge of the boundary surface and the base of the excrescences, the sides of the upper faces of the excrescences having abrupt terminations, the distance between adjacent bases being a fraction of the length of a base, whereby channels which widen laterally in the direction of flow are formed for the boundary layer between the excrescences.

3. A combination as set forth in claim 2 in which the sides of the excrescences are of S-shape so that the excrescences first taper slowly, then more rapidly and then more slowly again.

4. A combination as set forth in claim 2 in which the sides of each excrescence intersect in a knife edge at the apex of the excrescence.

5. A combination as set forth in claim 4 in which the knife edge is substantially normal to the general surface.

6. A combination as set forth in claim 2 in which in longitudinal section the upper surfaces of the excrescences are straight.

7. A combination as set forth in claim 2 in which the excrescences take the form of thin plates of approximately triangular shape, slightly inclined to the general surface, with their bases facing the flow and lying in the general surface.

8. A combination as set forth in claim 2 in which the excrescences are equally spaced and the space between adjacent bases is approximately one-sixth of the length of the base.

9. A combination as set forth in claim 2 in which the excrescences are pivoted on their bases whereby their projection from the general surface can be varied.

10. In combination with an imperforate solid boundary surface over which a fluid medium is movable, a plurality of rows of excrescences on the surface, each excrescence of generally triangular outline set with its base facing the flow and lying in the general boundary surface and rising to its apex, the height of the excrescences being at least 1.5 times the 99 percent thickness of the boundary layer under the conditions for which the surface is designed, the sides of the upper faces of the excrescences having abrupt terminations, the distance between adjacent bases being a fraction of the length of a base whereby in each row channels which widen laterally in the direction of flow are formed for the boundary layer between the excrescences.

11. A combination as set forth in claim 10 in which the excrescences in successive rows are axially in line.

12. A combination as set forth in claim 10 in which the bases of a succeeding row start at the apices of the preceding row.

13. In an aircraft wing, the provision on at least a part of the upper surface of the leading edge, of at least one row of excrescences of generally triangular form having their bases lying in the general surface of the wing facing forwardly and spaced apart by a fraction of a base length, the excrescences rising in thickness to their apices, the surface of the wing being imperforate at least in the immediate neighbourhood of the excrescences and the sides of the upper faces of the excrescences having abrupt terminations.

14. An aircraft wing, tailplane or fin having a portion of its trailing margin of serrated outline with the sides of the serrations inclined to the direction of air flow to leave spaces between the serrations which widen in the direction of flow, the junctions of the surface of the wing, tailplane or fin with the sides of the serrations being sharp, cornered, and combined with the wing, tailplane or fin a control member pivoted thereto, said control member having its forward margin of serrated outline interfitting with said serrated trailing margin and when it is in neutral position its surface continuing that of the wing, tailplane or fin, while when it is deflected the juxtaposition of said interfitting serrated margins constitutes at the junction a row of excrescences of generally triangular form having sharp corners at the junctions of their upper faces with their sides and channels between them expanding laterally in the direction of air flow.

15. In an aircraft wing the combination of a control surface pivotable in relation to the general surface of the wing, and on the surface constituted by the upper surfaces of the wing and control surface and near the leading edge of the control surface, at least one row of excrescences of generally triangular form having their bases lying in the general surface of the wing passing forwardly and spaced apart by a fraction of a base length, the excrescences rising in thickness to their apices and to a height which is at least 1.5 times the thickness of the 99 percent boundary layer under the conditions for which the control surfaces are intended.

16. An aircraft wing as set forth in claim 15 in which the control surface is an aileron.

17. An aircraft wing as set forth in claim 15 in which the control surface is a flap.

References Cited in the file of this patent

UNITED STATES PATENTS

| | | |
|---|---|---|
| 1,454,479 | McCullough | May 8, 1923 |
| 1,719,293 | Gripon | July 2, 1929 |
| 1,744,663 | O'Connor | Jan. 21, 1930 |
| 1,773,281 | Scott | Aug. 19, 1930 |
| 1,879,618 | Icre | Sept. 27, 1932 |
| 2,272,358 | Steinhans | Feb. 10, 1942 |
| 2,471,768 | Nagel | May 31, 1949 |

FOREIGN PATENTS

| | | |
|---|---|---|
| 357,637 | Great Britain | Sept. 28, 1931 |
| 794,841 | France | Dec. 26, 1935 |